(12) United States Patent
Taniguchi et al.

(10) Patent No.: US 7,301,873 B2
(45) Date of Patent: Nov. 27, 2007

(54) INFORMATION RECORDING MEDIUM, INFORMATION RECORDING DEVICE AND METHOD THEREFOR, AND COMPUTER PROGRAM PRODUCT AND STORAGE MEDIUM THEREFOR

(75) Inventors: Shoji Taniguchi, Tokorozawa (JP); Eiji Muramatsu, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 397 days.

(21) Appl. No.: 10/446,776

(22) Filed: May 29, 2003

(65) Prior Publication Data

US 2003/0223339 A1    Dec. 4, 2003

(30) Foreign Application Priority Data

May 29, 2002    (JP)    ............................. 2002-156453

(51) Int. Cl.
   *G11B 7/00*    (2006.01)
(52) U.S. Cl. .................................. 369/53.2; 369/275.3
(58) Field of Classification Search .................. 369/47, 369/53.2, 275.3
   See application file for complete search history.

(56) References Cited

U.S. PATENT DOCUMENTS

| | | | |
|---|---|---|---|
| 6,081,490 A | 6/2000 | Kuroda et al. ................. | 369/47 |
| 6,215,746 B1 * | 4/2001 | Ando et al. ................. | 369/53.2 |
| 6,339,571 B1 * | 1/2002 | Torazawa et al. .......... | 369/53.2 |
| 6,538,967 B1 * | 3/2003 | Lee ........................... | 369/47.46 |
| 6,556,524 B1 * | 4/2003 | Takeshita .................. | 369/47.43 |
| 6,671,243 B2 * | 12/2003 | Ando et al. ................. | 369/59.1 |
| 6,868,054 B1 * | 3/2005 | Ko ........................... | 369/59.25 |
| 6,934,236 B2 * | 8/2005 | Lee et al. ................. | 369/59.11 |
| 2002/0172115 A1 * | 11/2002 | Tsukihashi ............... | 369/53.18 |
| 2004/0022150 A1 * | 2/2004 | Lee et al. ................. | 369/47.39 |
| 2004/0071068 A1 * | 4/2004 | Lee et al. ................. | 369/59.11 |

FOREIGN PATENT DOCUMENTS

| | | |
|---|---|---|
| EP | 1 128 383 | 8/2001 |
| JP | 10-106008 | 4/1998 |
| JP | 11-232651 | 8/1999 |
| JP | 2001-351247 | 12/2001 |
| JP | 2002-32955 | 1/2002 |

OTHER PUBLICATIONS

JIS Handbook Information Processing Hardware Version, Japanese Standards Association, Apr. 21, 1999, pp. 1055-1061.

* cited by examiner

*Primary Examiner*—Wayne Young
*Assistant Examiner*—Linh T. Nguyen
(74) *Attorney, Agent, or Firm*—Young & Thompson

(57) ABSTRACT

On a recording medium, the version information indicating a version of the recording standard to which the information recording medium is adapted is recorded. Moreover, the normal recording condition information for recording information at a normal recording speed and the high speed recording condition information for recording the information at a higher recording speed than the normal recording speed are recorded. The recording condition information includes, for example, information about a write strategy for driving a laser light source. At the time of recording, the information recording device compares the version information on the information recording medium with the version information of the information recording device so as to judge whether or not the information can be recorded. When the judgment is made that the information cannot be recorded based on the version information, further the compatibility version information is compared with the version information of the information recording device so that a judgment is made as to whether or not the information can be recorded. In such a manner, the judgment can be properly made as to whether or not the recording can be executed on the information recording medium.

19 Claims, 6 Drawing Sheets

<Book type>

0000b : Read-Only DVD
    0001b : Rewritable DVD (DVD-RAM)
    0010b : Recordable DVD (DVD-R)
    0011b : Re-recordable DVD (DVD-RW)

<Part Version>

0000b : Version 0.9x
    0001b : Version 1.0x
    0010b : Version 1.1x
    0100b : Version 1.9x
    0101b : Version 2.0x
    0110b : Version 2.1x
    1000b : Version 3.0x
    Others : Reserved

FIG. 4

PREPIT INFORMATION

| ID | | |
|---|---|---|
| ID0 | | |
| ID1 | PART VERSION INFORMATION [1000b] | |
| ID2 | (WRITE STRATEGY FOR NORMAL SPEED RECORDING) | |
| ID3 | | |
| ID4 | | |
| ID5 | (WRITE STRATEGY FOR NORMAL SPEED RECORDING) | |
| ID6 | (WRITE STRATEGY FOR DOUBLE SPEED RECORDING) | |
| ID7 | COMPATIBILITY VERSION INFORMATION [0101b] | |
| ID8 | (WRITE STRATEGY FOR 4-TIMES HIGHER SPEED RECORDING) | |
| ID9 | | |
| ID10 | COMPATIBILITY VERSION INFORMATION [0101b] | |
| ID11 | (WRITE STRATEGY FOR 8-TIMES HIGHER SPEED RECORDING) | |
| ID12 | | |
| ID13 | COMPATIBILITY VERSION INFORMATION [1000b] | |

8bits

<COMPATIBILITY VERSION INFORMATION>

- 0000b : Version 0.9x
- 0001b : Version 1.0x
- 0010b : Version 1.1x
- 0100b : Version 1.9x
- 0101b : Version 2.0x
- 0110b : Version 2.1x
- 1000b : Version 3.0x
- Others : Reserved

INFORMATION RECORDING MEDIUM, INFORMATION RECORDING DEVICE AND METHOD THEREFOR, AND COMPUTER PROGRAM PRODUCT AND STORAGE MEDIUM THEREFOR

BACKGROUND OF THE INVENTION

1. Field of the Invention

The present invention relates to an additionally writable or rewritable recording medium such as a DVD-R (DVD-Recordable) and DVD-RW (DVD-Rewritable), as well as an information recording device and an information recording method for recording information on such a recording medium.

2. Description of Related Art

As an information recording medium onto which information can be additionally written or can be rewritten for a plurality of times, DVD-R and DVD-RW are known. On such an information recording medium, information about the recording speed and the recording condition suitable for the information recording medium is recorded. Specifically, part version information of a recording standard defining a recording method suitable for the disc is recorded in a control data zone in a lead-in area of the DVD-R or DVD-RW. The part version information indicates as to which version of the DVD recording standard the disc is adapted to.

Meanwhile, a drive device (information recording device) for recording information on the DVD-R or DVD-RW has version information of the drive device, indicating the version according to which the drive device can record information. When a certain disc is set, the drive device obtains the above-mentioned part version information from the lead-in area of the disc, and compares the part version information with the version information of the drive device. When the version information of the drive device is equal to or higher than the part version information of the disc, the disc is suitable for the information recording by the drive device. On the contrary, when the version information of the drive device is lower than the part version information of the disc, the drive device is not suitable for recording information on that disc, and the drive device ejects the disc.

In recent years, the performance of the drive device is improved, and there is demand of a disc which can cope with high speed recording such as four-times or eight-times higher speed recording. However, in a situation where discs which can cope with four-times and eight-times higher speed are mixed in a market, there may be a problem that the drive device erroneously ejects a recordable disc, because the part versions are not coincident.

For example, it is supposed that the part version of the four-times higher speed disc is 2.0× and the part version of the eight-times higher speed disc is 3.0×. Normally, in order to ensure the compatibility with lower versions, the eight-times higher speed disc is produced to be able to record information with a four-times higher speed mode. Therefore, on the eight-times higher speed disc, not only the eight-times higher speed recording can be executed by an eight-times higher speed drive device, but also the four-times higher speed recording can be executed by a four-times higher speed drive device.

However, according to the recording standards, since one disc has one part version, only the part version information of version 3.0× is recorded on the eight-times higher speed disc as mentioned above. Therefore, in the case where the four-times higher speed recording is tried on the eight-times higher speed disc by using the four-times higher speed drive device, the drive device reads the part version information (i.e., version 3.0×) of the eight-times higher speed disc and compares it with the version information (i.e., version 2.0×) of the drive device. As a result, although the drive device can record information onto that disc by the four-times higher speed recording mode, the drive device regards the disc as unusable and ejects it.

Thus, in a method of discriminating a recordable disc by using only the part version information, when information is recorded onto a disc of higher version by a drive device of lower version than the disc, the disc is automatically ejected although the recording can be actually executed.

SUMMARY OF THE INVENTION

The present invention has been achieved in order to solve the above problem. It is an object of this invention to provide an information recording medium and an information recording device that enable a proper judgment of the compatibility between a disc and a drive device and that ensures recording in a combination where actual recording is possible.

According to one aspect of the present invention, there is provided an information recording medium including: version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted.

In the above recording medium, the version information indicates a version of the recording standard to which the information recording medium is adapted. Moreover, the normal recording condition information for recording information at a normal recording speed and the high speed recording condition information for recording the information at a higher recording speed than the normal recording speed are recorded. The recording condition information includes, for example, information about a write strategy for driving a laser light source in order to record information. At the time of recording the information, the information recording device compares the version information on the information recording medium with the version information of the information recording device so as to judge whether or not the information can be recorded. When the judgment is made that the information cannot be recorded based on the version information, further the compatibility version information is compared with the version information of the information recording device so that a judgment is made as to whether or not the information can be recorded. Therefore, even when the judgment is made that the recording cannot be executed only based on the version information, if the judgment is made that the recording can be executed based on the compatibility version information individually corresponding to the high speed recording conditions, the information can be recorded. In such a manner, the judgment can be properly made as to whether or not the recording can be executed on the information recording medium.

The version information and the compatibility version information may have a same number of bits and may be defined according to a same bit allocation rule. In this case, a comparison process of the version information of the information recording device can be simplified.

The version information may be recorded in a lead-in area of the information recording medium, and the recording condition information and the compatibility version information may be recorded as prepit information on the information recording medium.

According to another aspect of the present invention, there is provided an information recording device for recording information on an information recording medium including version information indicating aversion of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the information recording device including: a first judging unit for comparing the version information recorded on the information recording medium with version information of the information recording device to judge whether or not the information recording device can record information on the information recording medium; a second judging unit for comparing the compatibility version information of the information recording medium with the version information of the information recording device to judge whether or not the information recording device can record information on the information recording medium, when the first judging unit judges that the information recording device cannot record information; and a recording unit for recording the information on the information recording medium when one of the first judging unit and the second judging unit judges that the information recording device can record information.

According to the information recording device described above, the version information indicating as to which version of the recording standard the information recording medium is adapted. Moreover, normal recording condition information for recording the information at a normal recording speed and high speed recording condition information for recording the information at one or more high recording speed higher than the normal recording speed are recorded. The information recording device compares the version information on the information recording medium with the version information of the information recording device so as to judge whether or not the information can be recorded. When the judgment is made that the information cannot be recorded based on the version information, further the compatibility version information is compared with the version information of the information recording device so that a judgment is made as to whether or not the information can be recorded. Therefore, even when the judgment is made that the recording cannot be executed only based on the version information, if the judgment is made that the recording can be executed based on the compatibility version information individually corresponding to the high speed recording conditions, the information can be recorded. In such a manner, the judgment can be properly made as to whether or not the recording can be executed on the information recording medium.

The information recording device may further include an ejecting unit for ejecting the information recording medium from the information recording device, when both of the first judging unit and the second judging unit judge that the information recording device cannot record information. Thus, the information recording medium which is finally judged that the recording is impossible is automatically ejected from the information recording device and the recording is not executed.

The recording device may obtain the recording condition information corresponding to the version information of the information recording device from the information recording medium and records the information based on the recording condition information. By this, the information is recorded according to the suitable recording condition information previously recorded on the information recording medium.

According to another aspect of the present invention, there is provided an information recording device for recording information on an information recording medium including version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the information recording device including: a judging unit for comparing the compatibility version information recorded on the information recording medium with version information of the information recording device to judge whether or not the information recording device can record information on the information recording medium; and a recording device for recording the information on the information recording medium, when the judging unit judges that the information recording device can record the information.

In accordance with the above information recording device, the compatibility version information is compared with the version information of the information recording device without referring to the version information, so that the judgment can be made as to whether or not the recording information can be recorded. Thus, the judging process can be simplified.

According to still another aspect of the present invention, there is provided an information recording method for recording information on an information recording medium including version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the information recording method including the steps of: a first judging step for comparing the version information recorded on the information recording medium with version information of the information recording device to judge whether or not the information recording device can record information on the information recording medium; a second judging step for comparing the compatibility version information of the information recording medium with the version information of the information recording device to judge whether or not the information recording device can record information on the information recording medium, when the first judging step judges that the information recording device cannot record information; and a recording step for recording the information on the information recording medium when one of the first judging step and the second judging step judges that the information recording device can record information.

In accordance with the above method, similarly to the information recording device, the version information on the information recording medium is compared with the version information of the information recording device so that a judgment is made as to whether or not the information can be recorded. When the judgment is made that the information cannot be recorded based on the version information, further the compatibility version information is compared with the version information of the information recording device so that a judgment is made as to whether or not the information can be recorded. Therefore, even when the judgment is made that the recording cannot be executed only based on the version information, if the judgment is made that the recording can be executed based on the compatibility version information individually corresponding to the high speed recording conditions, the information can be recorded. In such a manner, the judgment can be properly made as to whether or not the recording can be executed on the information recording medium.

According to still another aspect of the present invention, there is provided a computer program product for information recording control executed by a computer in an information recording device which records information on an information recording medium including version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the program product controls the computer to function as: a first judging unit for comparing the version information recorded on the information recording medium with version information of the information recording device to judge whether or not the information recording device can record information on the information recording medium; a second judging unit for comparing the compatibility version information of the information recording medium with the version information of the information recording device to judge whether or not the information recording device can record information on the information recording medium, when the first judging unit judges that the information recording device cannot record information; and a recording unit for recording the information on the information recording medium when one of the first judging unit and the second judging unit judges that the information recording device can record information.

According to still another aspect of the present invention, there is provided a computer program storage medium for storing a computer program for information recording control executed by a computer in an information recording device which records information on an information recording medium including version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the program controls the computer to function as: a first judging unit for comparing the version information recorded on the information recording medium with version information of the information recording device to judge whether or not the information recording device can record information on the information recording medium; a second judging unit for comparing the compatibility version information of the information recording medium with the version information of the information recording device to judge whether or not the information recording device can record information on the information recording medium, when the first judging unit judges that the information recording device cannot record information; and a recording unit for recording the information on the information recording medium when one of the first judging unit and the second judging unit judges that the information recording device can record information.

In accordance with the computer program product and the storage medium, when the information recording control program is executed, similarly to the information recording device, the version information recorded on the information recording medium is compared with the version information of the information recording device so that a judgment is made as to whether or not the information can be recorded. When the judgment is made that the information cannot be recorded based on the version information, further the compatibility version information is compared with the version information of the information recording device so that a judgment is made as to whether or not the information can be recorded. Therefore, even when the judgment is made that the recording cannot be executed only based on the version information, if the judgment is made that the recording can be executed based on the compatibility version information individually corresponding to the high speed recording conditions, the information can be recorded. In such a manner, the judgment can be properly made as to whether or not the recording can be executed on the information recording medium.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 4 is a diagram showing a recording example and a bit allocation example of compatibility version information;

DETAILED DESCRIPTION OF THE PREFERRED EMBODIMENTS

The preferred embodiment of the present invention will now be described below with reference to the attached drawings.

[DVD-R]

Figure 1:
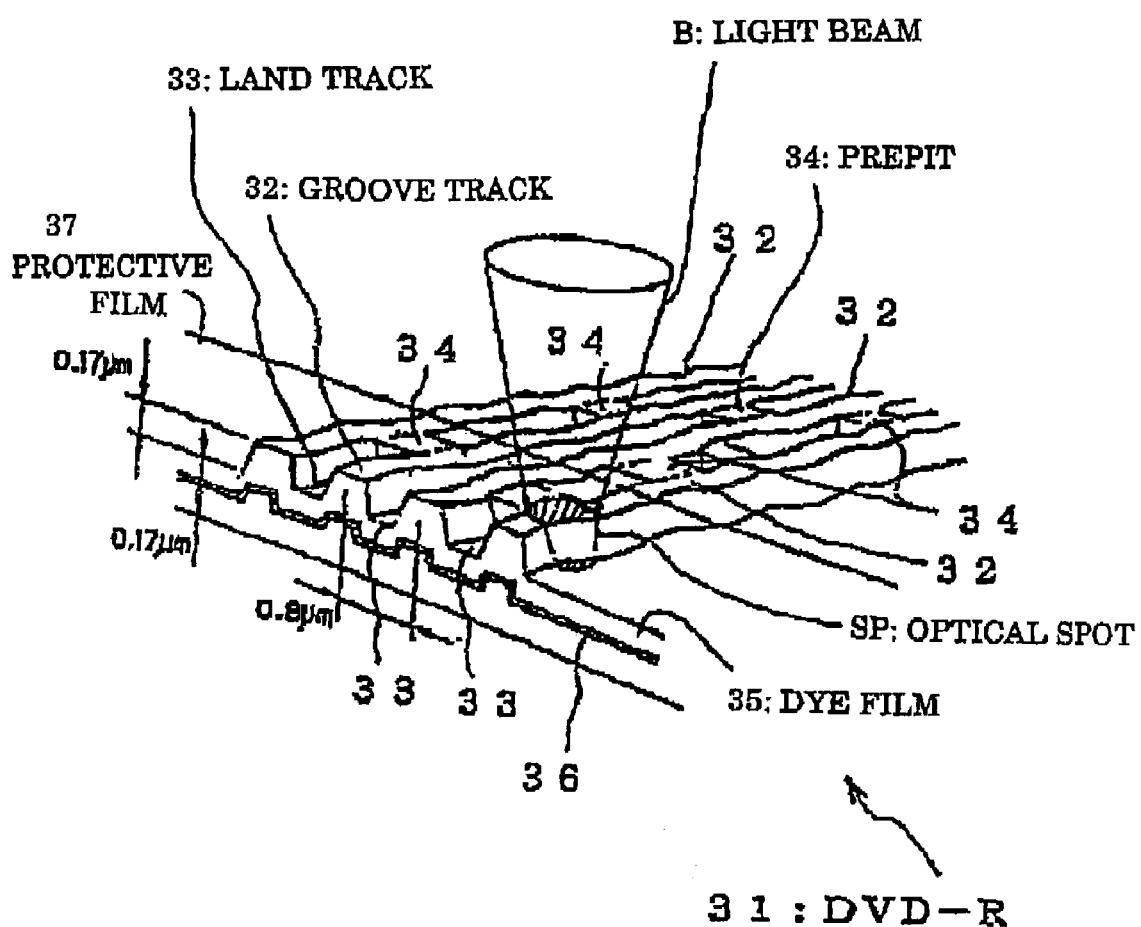
FIG. 1 is a diagram showing a structure of a disc surface of a DVD-R to which the present invention is applied.

At the beginning, a DVD-R serving as a recording medium to which the present invention is applied will be described with reference to FIGS. 1 and 2.

First, the structure of the DVD-R will be described with reference to FIG. 1. In order to clarify the structure, FIG. 1 shows a diagram viewed from a rear surface of a disc. In FIG. 1, the DVD-R 31 is a dye-type DVD-R which has a dye film 35 which serves as a data recording layer and on which data can be written only once. The DVD-R 31 is provided with a groove tracks 32 serving as data recording tracks and land tracks 33 serving as guide tracks for guiding a light beam B, such as a laser beam serving as a reproduction light or a recording light, to the groove tracks 32. The DVD-R 31 is further provided with a protective film 37 for protecting the groove tracks 32 and the land tracks 33, and a gold vapor deposition film 36 for reflecting the light beam B when recorded data are reproduced. Prepits 34 corresponding to prepit information are formed on the land track 33. The prepits 34 are formed before the shipment of the DVD-R 31.

Further, on the DVD-R 31, the groove tracks 32 are wobbled with a frequency corresponding to a rotational speed of the disc. The wobbled groove tracks 32 are also formed before the shipment of the DVD-R 31, similarly to the prepits 34.

When recording information (information such as image information to be recorded, other than the prepit information) onto the DVD-R 31, a data recording device described later extracts the wobbling frequency of the groove track 32 so as to control the rotation of the DVD-R 31 at a predetermined rotational speed. Further, the data recording device detects the prepits 34 to obtain the prepit information, and sets an optimum output or the like of the light beam B serving as a recording light based on the prepit information. Still further, the data recording device obtains address information or the like indicating a position on the DVD-R 31 onto which the recording information is to be recorded, and records the recording information on the corresponding recording position based on the address information.

At the time of recording the recording information, the light beam B is irradiated, so that its center coincides with a center of the groove track 32. By forming information pits corresponding to the recording information on the groove track 32, the recording information is recorded. At that time, as shown in FIG. 1, the size of the light spot SP is set such that the light spot SP covers not only to the groove track 32 but also the land track 33 partially.

The prepit information is detected from the prepit 34 by a push-pull method using a partially reflected light of the light spot SP formed on the land track 33. The push-pull method uses photodetectors divided by a division line parallel with a tangent direction of the groove track 32, namely, the rotational direction of the DVD-R 31 (hereinafter, referred to as "radial push-pull method"). Also, a wobble signal is extracted from the groove track 32 to obtain a recording clock signal, described later, which is synchronized with the rotation of the disc.

Next, the description will be given of a recording format of the prepit information recorded, in advance, on the DVD-R 31 with reference to FIG. 2. In FIG. 2, an upper part shows a recording format of the recording information data, and waveforms on a lower part show a wobbling state of the groove track 32 on which the recording information is recorded (i.e., a plan view of the groove tracks 32). The upturned arrows between the recording information and the wobbling state of the groove track 32 schematically show positions where the prepits 34 are formed. In FIG. 2, the wobbling state of the groove track 32 is shown by a larger amplitude than an actual amplitude, for easy understanding. It is to be noted that the recording information is recorded on the center line of the groove track 32.

Figure 2:
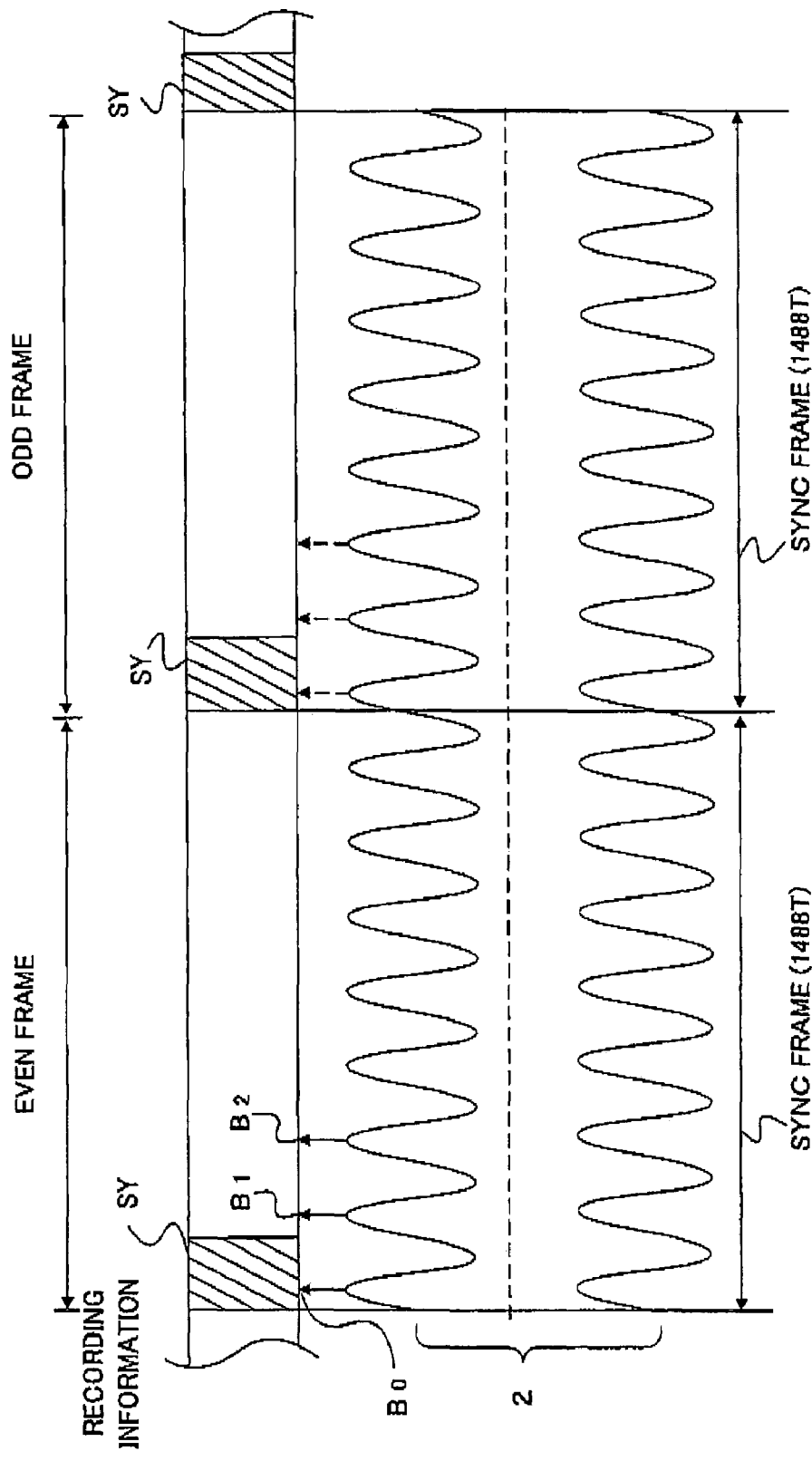
FIG. 2 is a diagram showing a manner of forming a prepit of the DVD-R.

As shown in FIG. 2, the recording information to be recorded on the DVD-R 31 is previously divided per sync frame, which is a unit of information. One recording sector is formed by 26 sync frames, and one ECC (Error Correcting Code) block is formed by 16 recording sectors. It is noted that one sync frame has a length which is 1488 (1488T) times as long as a unit length (hereinafter referred to as "T") corresponding to a pit interval defined by a recording format at the time of recording the recording information. The portion having a length of 14T at the head of one sync frame is used as synchronizing information SY for synchronization of every sync frame.

Meanwhile, the prepit information to be recorded on the DVD-R 31 is recorded per sync frame. In the case where the prepit information is recorded on the DVD-R 31 as the prepits 34, one prepit 34 indicating a synchronizing signal in the prepit information is inevitably formed on the land track 33 adjacent to an area in which the synchronizing information SY in each sync frame of the recording information is recorded. At the same time, one or two prepits 34 indicating contents of the prepit information to be recorded are formed on the land track 33 adjacent to a first half portion in the sync frame other than the synchronizing information SY. It is noted that the prepits 34 are not occasionally formed on the half portion in the sync frame other than the synchronizing information SY depending on contents of the prepit information to be recorded.

At this time, in one recording sector, the prepit 34 is formed only in even-numbered sync frames (hereinafter referred to as "even frames") and the prepit information is recorded. Namely, in FIG. 2, in the case where the prepits 34 are formed in the even frames (as shown by an upturned arrows of solid line), no prepit 34 is formed in ODD frames adjacent to the even frames. A relationship of existence/inexistence of the prepits 34 (referred to as the prepits B0, B1 and B2 from the head of the sync frame) in one even frame and the following odd frame is set according to whether or not the one even frame is at the head of the recording sector and according to the contents of the information to be recorded on the one even frame and the following odd frame.

More specifically, in the case where the prepit is formed in the even frame, all the prepits 34 (i.e., the prepits B0, B1 and B2) are formed in the sync frame at the head of the recording sector. In the sync frames other than the sync frames at the head of the recording sector, only the prepits B0 and B2 are formed when the prepit information to be recorded on the sync frames is "1", and the prepits B0 and B1 are formed when the prepit information to be recorded is "0". Moreover, in the case where the prepit is formed on the odd frames, the prepits B0 and B1 are formed in the sync frame at the head of the recording sector, and the case of the above even frames is applied to the sync frames other than the sync frames at the head of the recording sector.

Whether the prepits 34 are formed in the even frames or the odd frames is determined dependently upon the position of the prepit 34 previously formed on the adjacent land track 33. Namely, the prepits 34 are normally formed on the even frames. However, the prepits 34 are formed on the odd frames if the prepits 34 formed on the even frame adjoin the prepits 34 previously formed on the adjacent land track 33 in a radial direction of the disc of the DVD-R 31. By forming the prepits 34 in such a manner, the prepits 34 do not exist on the adjacent land tracks 33 at the positions adjacent to each other, thereby reducing an influence of a crosstalk at the time of detecting the prepits 34.

Meanwhile, the groove tracks 32 are wobbled in the entire sync frame by a constant wobbling frequency f0 of 140 KHz (the frequency with which 8 waves of the wobble signal may be included in one sync frame). The data recording device described later extracts the constant wobbling frequency f0 to detect a signal for controlling rotation of a spindle motor, and generates a recording clock signal.

In order to maintain a phase relationship between the prepit 34 and the wobble signal to be constant, the prepit B0 is formed at a predetermined position remote from a starting position of the sync frame (for example, a position remote by 7T), and the prepits B1 and B2 are formed so as to be separated from the prepit B0 by 186T (1488T/8). A prepit forming method is disclosed in detail in Japanese Patent Application Laid-Open under No. 10-154332.

[Part Version Information]

Figure 3:
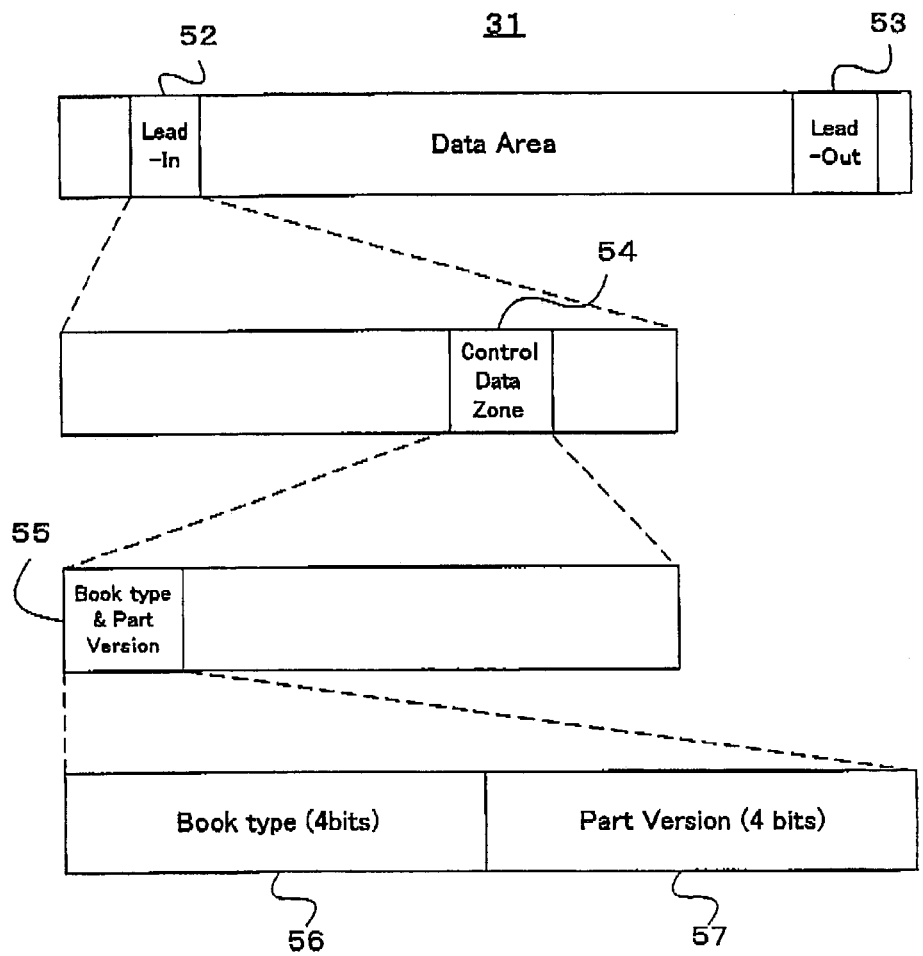
FIG. 3 is a diagram showing a recording position of part version information and a bit allocation example.

Next, part version information will be described. As mentioned above, the part version information indicates aversion of a recording standard to which the DVD-R disc is adapted. FIG. 3 shows a recording position of the part version information on the DVD-R disc. As shown in FIG. 3, the DVD-R disc 31 includes a lead-in area 52, a data area and a lead-out area 53, and the lead-in area 52 includes a control data zone 54. A head of the control data zone 54 is provided with a book type and part version area 55 in which book type information 56 and the part version information 57 are recorded. It is noted that the part version information is also recorded in an area (ID1) for recording an ECC block address or the like in the prepit information shown in FIG. 4.

The book type information 56 indicates a type of a recording standard (book) in which a DVD standard is described. Specifically, as shown in FIG. 3, the book type information 56 indicates one of a read-only DVD, a DVD-RAM, a DVD-R and a DVD-RW the disc, by the four bit data. In this embodiment, since the DVD-R disc is used, "0010b" is recorded as the book type information.

Meanwhile, the part version information 57 indicates a version of the recording standard (i.e., part version) to which the disc is adapted specifically, as shown in FIG. 3, the part version information 57 indicates which part version of versions 0.9× to 3.0× the disc corresponds to, by using four bit data. In this embodiment, since the disc has a part version 3.0×, the part version information "1000b" is recorded.

Therefore, an information recording device (e-g., a drive device) for recording the recording information onto the DVD-R refers to the part version information 57 to obtain the part version of the DVD-R, and then compares the obtained part version with a part version of the information recording device. The detail of this operation will be described later.

[Compatibility Version Information]

Next, the description will be given of compatibility version information which is one characteristic portion of the present invention. The compatibility version information describes the version to which the disc is adapted, in association with a recording write strategy. The recording positions of the compatibility version information are shown in FIG. 4. As shown in FIG. 4, the compatibility version information is included in the prepit information recorded on a disc in the form of the prepits, and is described in the prepit information given by the prepits in the lead-in area. In this embodiment, the compatibility version information is recorded in an area for defining the write strategy of double speed recording (ID6 to ID7), an area for defining the write strategy for four-times higher speed recording (ID8 to ID10) and an area for defining the write strategy for eight-times higher speed recording (ID11 to ID13) in the prepit information. Also, as shown in FIG. 4, the compatibility version information indicates one of the plural versions of the recording standard, by the tour bit data.

As mentioned above, the part version information indicates a version of the DVD recording standard to which the disc is adapted, and only one version is determined for one disc. For example, the part version of a disc adapted to the eight-times higher speed recording is version 3.0×, and the part version of a disc adapted to the four-times higher speed recording is version 2.0×. For this reason, even if a drive device adapted to the four-times higher speed recording can actually record information on a disc, which is adapted to the eight-times higher speed recording, at four-times higher speed, the part version of the disc is only version 3.0× which is the part version of the disc adapted to the eight-times higher speed recording.

On the contrary, the compatibility version information indicates all versions of the recording standards with which information can be actually recorded on the disc. Namely, in the case where information can be recorded at the four-times higher speed on a disc which is adapted to the eight-times higher speed by an information recording device adapted to the four-times higher speed recording, the compatibility version information includes the version information corresponding to the four-times higher speed recording.

FIG. 4 shows an example of the disc adapted to the eight-times higher speed recording, and the part version information of this disc is version 3.0× (see. FIG. 3). However, as shown in FIG. 4, the compatibility version information include the version information for all of the write strategy for the double (two-times higher) speed recording, the write strategy for the four-times higher speed recording and the write strategy for the eight-times higher speed recording. Therefore, in this disc adapted to the eight-times higher speed recording, the compatibility version information indicates that the write strategy for eight-times higher speed recording described in the area ID11 to ID13 is adapted to the version 3.0×, the write strategy for the four-times higher speed recording described in the area ID8 to ID10 is adapted to the version 2.0×, and the write strategy for the double speed recording described in the area ID6 to ID7 is adapted to the version 2.0×. Namely, information can be recorded on the disc at any one of double speed to the eight-times higher speed by using the write strategy of the respective recording speeds.

In this embodiment, bit allocation rule of the compatibility version information is identical to the bit allocation rule of the part version information shown in FIG. 3. This is advantageous in that the comparison process of the version information can be simplified, but it is not indispensable. Namely, the bit allocation rule of the compatibility version information may be different from the bit allocation rule of the part version information.

[Information Recording and Reproducing Device]

Next, an embodiment of an information recording and reproducing device of the present invention will be described with reference to FIG. 5. In the following embodiment, the prepits 34 including the address information or the like on the DVD-R 31 and the wobbling groove tracks 32 are previously formed on the DVD-R 31. When the recording information is recorded, the information recording and reproducing device S controls the rotation of the DVD-R 31 based on the wobbling frequency of the groove tracks 32, and detects the prepits 34 to obtain the address information on the DVD-R31. Thereby, the information recording and reproducing device S detects the recording position on the DVD-R 31 and records the recording information. Further, the information recording and reproducing device S detects the prepits 34 to obtain the compatibility version information from the prepit information shown in FIG. 4 and obtain the part version information 7 from the control data zone in the lead-in area shown in FIG. 3.

Figure 5:
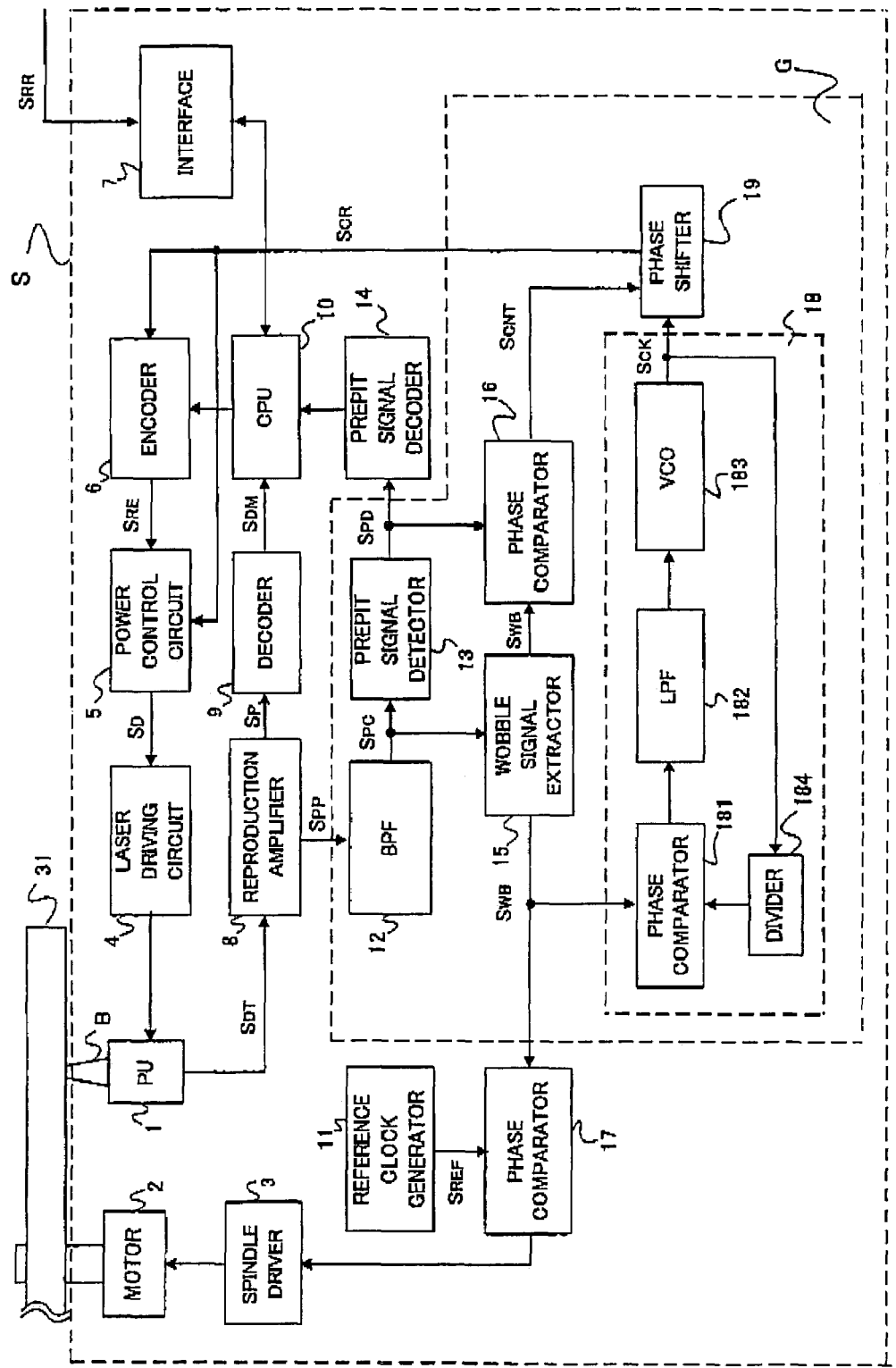
FIG. 5 is a block diagram showing a configuration of an information recording device.

As shown in FIG. 5, the information recording and reproducing device S includes a pickup 1, a spindle motor 2, a spindle driver 3, a laser driving circuit 4, a power control circuit 5, an encoder 6, an interface 7, a reproduction amplifier 8, a decoder 9, a processor (CPU) 10, a reference clock generator 11 for generating a reference clock signal for rotation control, a BPF (Band Pass Filter) 12, a prepit signal detector 13, a prepit signal decoder 14, a wobble signal extractor 15, a phase comparator 16, a phase comparator 17 for generating a rotation control signal, a PLL (Phase Locked Loop) circuit 18 and a phase shifter 19. The PLL circuit 18 includes a phase comparator 181, an LPF (Low Pass Filter) 182, a VCO (Voltage Controlled Oscillator) 183 and a divider 184.

The information recording and reproducing device S receives recording information to be recorded from an external host computer (not shown) via the interface 7, and the recording information recorded on the DVD-R 31 is output via the interface 7.

Next, an entire operation will be described. The pickup 1 includes a laser diode, a polarized beam splitter, an objective lens and a photodetector, which are not shown. At the time of the recording operation, the pickup 1 irradiates the light beam B having an emitting power, which is supplied from the laser driving circuit 4 and changes according to the laser driving signal based on the recording information, onto the DVD-R 31 by so as to record the recording information. At the time of the reproducing operation, the pickup 1 irradiates the light beam B having a constant emitting power (i.e., reading power) onto the DVD-R 31 and receives the reflected light by the photodetector.

In addition, the pickup 1 receives the reflected light of the light beam B irradiated on the information recording surface from the information recording surface via the photodetector and converts the reflected light into an electric signal. Then, the pickup 1 applies operation processing based on a radial push-pull system onto the electric signal, for example, so as to generate a detecting signal SDT carrying a prepit signal of the prepits 34, a wobble signal of the groove track 32 and the recording information, and outputs the detection signal SDT to the reproduction amplifier 8.

The reproduction amplifier 8 amplifies the detecting signal SDT carrying the prepit signal of the prepits 34 and the wobble signal of the groove track 32 output from the pickup 1, and outputs the prepit information signal SPP including the prepit signal of the prepits 34 and the wobble signal of the groove track 32 to the BPF 12. At the time of the reproducing operation, the reproduction amplifier 8 outputs an RF signal Sp corresponding to the recording information already recorded to the decoder 9.

The BPF 12 removes a noise component included in the prepit information signal SPP supplied from the reproduction amplifier 8 and outputs a composite signal SPC, on which the prepit signal is superimposed at predetermined positions of the wobble signal (e.g., maximum amplitude positions), to the prepit signal detector 13 and the wobble signal extractor 15.

The prepit signal detector 13 includes a comparator, not shown, which compares the composite signal SPC with a predetermined prepit detection reference level Vrp which is larger than the maximum amplitude level of the wobble signal. In a period in which the amplitude level of the composite signal SPC is larger than the prepit detection reference level Vrp, namely, in the period in which the prepit exists, the prepit signal detector 13 outputs a prepit detection signal SPD, which is a pulse signal, to the prepit signal decoder 14 and the phase comparator 16.

The prepits signal decoder 14 decodes the prepit information, including the address information on the DVD-R 31, from the supplied prepit detection signal SFD to output the decoded information to the CPU 10. The prepit signal decoder 14 extracts the part version information, the compatibility version information and the like included in the prepit information.

The wobble signal extractor 15 serving as a wobble signal extracting device has a comparator, not shown, which compares the composite signal SPC with a predetermined level, for example, an intermediate level Vr0 of a PP (Peak-to-Peak) value of the wobble signal. The wobble signal extractor 15 outputs a pulse signal which is at H (high) level during a period, in which the amplitude level of the composite signal SPC is larger than the reference level Vr0, to the phase comparators 16 and 17 and the PLL circuit 18 as an extracted wobble signal SWB.

The PLL circuit 18 includes the phase comparator 181, the LPF 182, the VCO 183 and the divider 184, and outputs a clock signal SCK which is synchronized with the phase of the extracted wobble signal SWB to the phase shifter 19.

The phase comparator 16 compares the phases of the prepit detection signal SPD and the extracted wobble signal SWB according to the operation described later, and outputs a phase adjusting signal SCNT which indicates a phase shift from a predetermined phase relationship, that the prepit detection signal SPD and the extracted wobble signal SWB normally posses, to the phase shifter 19.

The phase shifter 19 adjusts the phase of the clock signal SCK supplied from the PLL circuit 18 based on the phase adjusting signal SCNT, and outputs it to the encoder 6 and the power control circuit 5 as a recording clock signal SCR.

The phase comparator 17 compares the phase of the extracted wobble signal SWB with the phase of the reference clock signal SREF, which carries a reference frequency component of the rotational speed of the DVD-R 31 and is supplied from the reference clock generator 11, and supplies the phase difference signal to the spindle motor 2 via the spindle driver 3 as a rotation control signal. Thus, the spindle servo is performed, and the DVD-R 31 is rotated by the spindle motor 2 at a predetermined speed.

The interface 7 performs an interface operation for capturing recording information SRR supplied from the host computer, not shown, into the information recording and reproducing device S under the control by the CPU 10, and outputs the recording information SRR to the encoder 6 via the CPU 10

The encoder 6 executes an ECC process, a 8/16 modulating process and a scramble process using the recording clock signal SCR supplied from the phase shifter 19 as a timing signal so as to generate a modulated signal SRE, and output it to the power control circuit 5.

The power control circuit 5 converts a waveform of the modulated signal SRE based on the recording clock signal SCR output from the phase shifter 19 (so-called, write strategy process) in order to maintain the shape of recording pits formed on the disc to be appropriate, and output it to the laser driving circuit 4 as a recording signal SD. It is noted that the CPU 10 controls the waveform of the modulated signal SRE based on the write strategy information (see. FIG. 4) in the prepit information generated by the prepit signal decoder 14.

The laser driving circuit 4 outputs the laser driving signal for actually driving the laser diode, not shown, in the pickup 1 to emit the light beam B having the emitting power according to the supplied recording signal SD.

The CPU 10 stores, in an internal memory, the version information of the device side indicating the recording standard at the time when the information recording and reproducing device S records the recording information. At the time of the recording operation, the CPU 10 controls the entire information recording and reproducing device so as to obtain the address information from the prepit information supplied from the prepit signal decoder 14 and record the recording information at the position on the DVD-R 31 corresponding to the address information. Further, at the time of the reproducing operation, the CPU 10 controls the entire information recording and reproducing device S to obtain the recording information recorded on the DVD-R 31 from the decoded signal SDM and outputs it to the external host computer.

[Information Recording Process]

Figure 6:
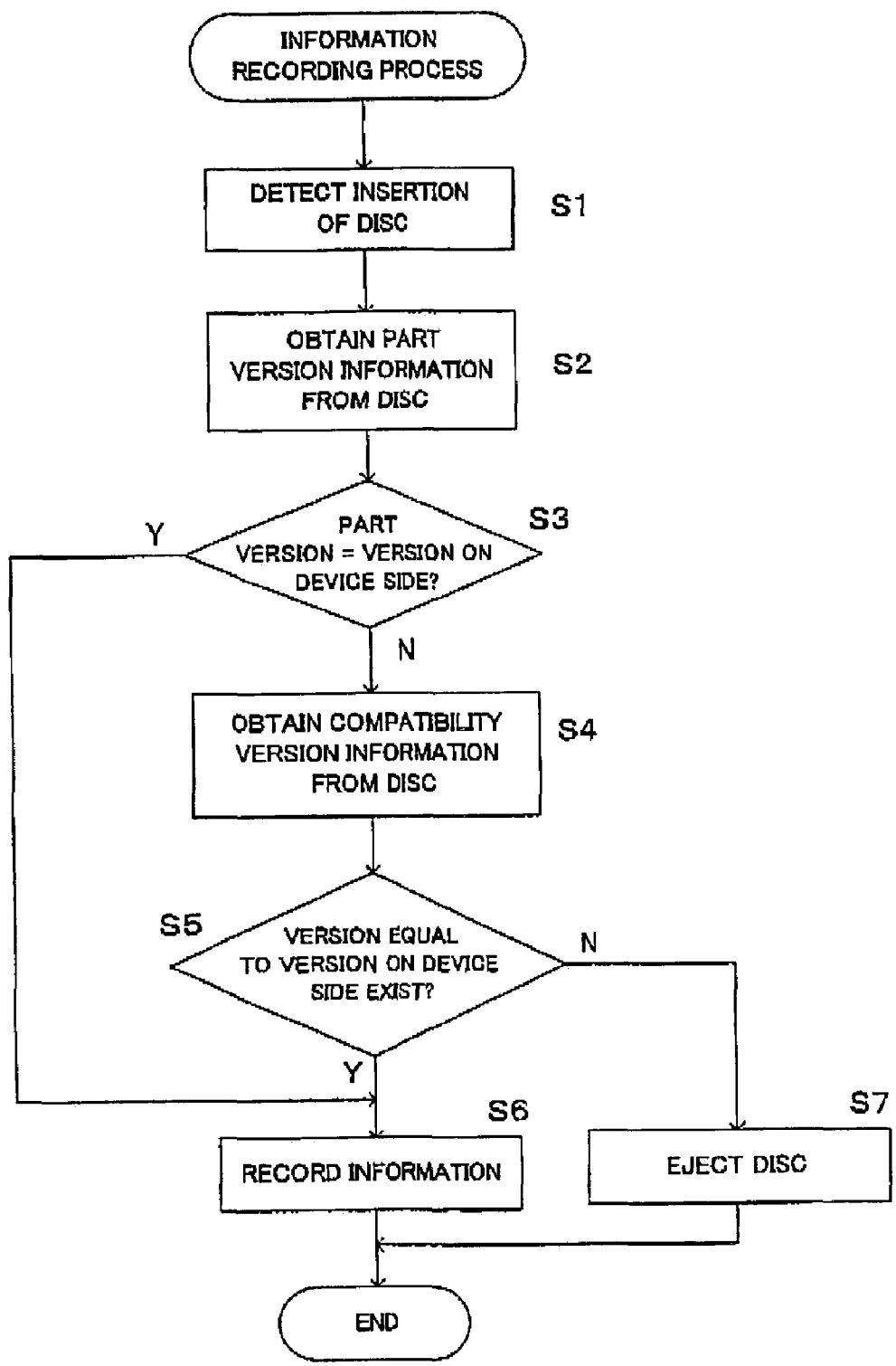
FIG. 6 is a flowchart showing an information recording process according to the present invention.

Next, the information recording process executed by the information recording and reproducing device will be described below with reference to the flowchart of FIG. 6. The information recording process described below is performed in such a manner that the CPU 10 of the information recording and reproducing device S shown in FIG. 5 executes a predetermined program of information recording process which is prepared in advance. At that time, the CPU 10 obtains the part version information shown in FIG. 3 or 4 from the control data zone in the lead-in area or the prepit information as described below, and also obtains the compatibility version information shown in FIG. 4 and the write strategy information from the prepit information.

First, when the CPU 10 detects that a disc is inserted into the information recording and reproducing device (step S1), the CPU 10 obtains the part version information from the disc (step S2).

Then, the CPU 10 compares the version information of the device, which is stored in the memory in the CPU 10 and indicates the recording standard that the information recording device uses to record information, with the part version information of the disc obtained at step S2 (step S3). When they coincide with each other, it is found that the disc is adapted to the information recording by the information recording device. Thus, the process goes to step S6, and the CPU 10 controls the information recording device to record the information utilizing the write strategy corresponding to the recording speed indicated by the part version information.

On the contrary, when the version information of the device and the version information of the disc do not coincide with each other, the CPU 10 obtains the compatibility version information from the disc (step S4), and compares them with the version information of the device. When the version information of the device coincides with any one of the compatibility version information obtained in step S4, the CPU 10 obtains the write strategy of the recording speed corresponding to the coincided version from the prepit information shown in FIG. 4, and records information on the disc (step S6).

When the version information which coincides with the version information of the device does not exist in the compatibility version information, the CPU 10 ejects the disc (step S7) and ends the process.

In the information recording process, first it is judged whether or not the version of the device coincides with the part version of the disc, and when they do not coincide with each other, it is further judged, based on the compatibility version information, whether or not the information can be recorded on the disc at other recording speed. When the compatibility version information corresponding to the version of the information recording device is recorded on the disc, information is recorded by utilizing the write strategy adapted to the recording speed.

[Modified Example]

In the information recording process described with reference to FIG. 6, first it is judged based on the part version information whether or not the information can be recorded, and when it is judged that the recording is impossible, it is further judged based on the compatibility version information whether or not the information can be recorded. Alternatively, the information recording device may be configured such that the judgment based on the part version information is omitted and the judgment as to whether or not the information is recordable is made only based on the compatibility version information.

Further, in the information recording process described above, the part version information is obtained from the disc in step S2, and thereafter the compatibility version information is obtained from the disc in step S4 only when the part version of the disc is not identical to the version of the device in step S3. However, the part version information and the compatibility version information may be obtained at the same time in step S2.

While the above embodiment is described by exemplifying a DVD device of exclusive use, such as a DVD-R/RW recorder, the information recording device or the information recording and reproducing device of the present invention may be realized by a DVD drive attached to a personal computer, for example In that case, the same function as the above DVD device of exclusive use such as the DVD-R/RW recorder may be realized by the personal computer which executes an information recording control program for executing the information recording process. A user can obtain such an information recording control program in the form of a recording medium such as a CD-ROM or a DVD-ROM or by the data communication via a communication device such as a network.

The embodiment described above is directed to the case where the present invention is applied to the DVD-R, but the present invention can be similarly applied to another recording media such as CD-R, CD-RW, DVD-RW and so on.

As described above, according to the present invention, not only the part version information but also the compatibility version information are taken into consideration to determine whether or not information can be recorded. Since the compatibility version information indicates the recording speed and the version information with which information can be recorded on the disc, a judgment can be accurately made on whether or not information can be recorded on the disc by the information recording device.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2002-156453 filed on May 29, 2002 including the specification, claims, drawings and summary is incorporated herein by reference in its entirety.

What is claimed is:

1. An information recording medium for storing information recorded by a drive device, comprising:
    a version information indicating a version of a recording standard under which the drive device will be operated;
    normal recording condition information for causing the drive device to be operated for recording information at a normal recording speed, the normal recording condition information corresponding to the version information;
    first high speed recording condition information for causing the drive device to be operated for recording the information at a first high recording speed higher than the normal recording speed, the first high speed recording condition information corresponding to the version information; and
    compatibility version information indicating recording compatibility of the recording standard to which second high speed recording condition information is adapted for causing the drive device to be operated for recording the information at a second high recording speed, the second high recording speed recording being slower than the first high recording speed recording,
    wherein the drive device is controlled for recording by the second high speed recording condition information corresponding to the compatibility version information.

2. The information recording medium according to the claim 1, in combination with the drive device,
    wherein the drive device has its own version information which is different than the version information recorded in the recording medium.

3. The information recording medium according to the claim 1, wherein,
    the compatibility version information corresponds to another version information indicating another version of the recording standard under which the drive device will be operated,
    the another version information is different from the version information, and
    the another version information is an earlier version of the recording standard than the version information.

4. An information recording medium of claim 1, wherein,
    the recording medium is one of a DVD-R disk and a DVD-RW disk,
    the second high speed recording condition information corresponds to recording at a four-times normal speed (4×), and
    the first high speed recording condition information corresponds to recording at a speed greater than the four-times normal speed (>4×).

5. The information recording medium according to claim 1, wherein the version information and the compatibility version information have a same number of bits and are defined according to a same bit allocation rule.

6. The information recording medium according to claim 1, wherein the version information is recorded in a lead-in area of the information recording medium, and the recording condition information and the compatibility version information are recorded as prepit information on the information recording medium.

7. An information recording device for recording information on an information recording medium comprising version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the compatibility version information corresponding to one of the high speed recording condition information for recording information at the high recording speed, the information recording device comprising:
    a first judging unit for comparing the version information recorded on the information recording medium with version information of the information recording device to judge whether or not the version information recorded on the information recording medium coincides with the version information of the information recording device, coinciding indicating that the information recording device can record information on the information recording medium, and not coinciding indicating that the information recording device cannot record information on the information recording medium based on the version information;
    a second judging unit for comparing the compatibility version information of the information recording medium with the version information of the information recording device to judge whether or not the information recording device can record information on the information recording medium based on the compatibility version information, when the first judging unit judges that the information recording device cannot record information; and
    a recording unit for recording the information on the information recording medium when one of the first judging unit and the second judging unit judges that the information recording device can record information,
    wherein the recording unit records the information at the recording speed of the high speed recording condition information corresponding to the compatibility information which coincides with the version information of the information recording device in comparison by the second judging unit, when the second judging unit judges that the information recording device can record information.

8. The information recording device according to claim 7, further comprising an ejecting unit for ejecting the information recording medium from the information recording device, when both of the first judging unit and the second judging unit judge that the information recording device cannot record information.

9. The information recording device according to claim 7, wherein the recording device obtains the recording condition information corresponding to the version information of the information recording device from the information recording medium and records the information based on the recording condition information.

10. An information recording device for recording information on an information recording medium comprising version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the compatibility version information corresponding to one of the high speed recording condition information for recording information at the high recording speed, the information recording device comprising:
- a judging unit for comparing i) the version information recorded on the information recording medium with version information of the information recording device, and ii) the compatibility version information recorded on the information recording medium with the version information of the information recording device, to judge whether or not information recording device can record information on the information recording medium; and
- a recording device for recording the information on the information recording medium, when the judging unit judges that the information recording device can record the information,
- wherein the recording unit records the information at the recording speed of the high speed recording condition information corresponding to the compatibility information which coincides with the version information of the information recording device in comparison by the judging unit, when the judging unit judges that the information recording device can record information.

11. An information recording method for recording information on an information recording medium comprising version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the compatibility version information corresponding to one of the high speed recording condition information for recording information at the high recording speed, the information recording method comprising the steps of:
- a first judging step for comparing the version information recorded on the information recording medium with version information of the information recording device to judge whether or not the information recording device can record information on the information recording medium to determine if the version information recorded on the information recording medium coincides with version information of the information recording device;
- a second judging step for comparing the compatibility version information of the information recording medium with the version information of the information recording device to judge whether or not the information recording device can record information on the information recording medium based on the compatibility version information, when the first judging step judges that the information recording device cannot record information based on the version information recorded on the information recording medium not coinciding with version information of the information recording device; and
- a recording step for recording the information on the information recording medium when one of the first judging step and the second judging step judges that the information recording device can record information,
- wherein the recording step records the information at the recording speed of the high speed recording condition information corresponding to the compatibility information which coincides with the version information of the information recording device in comparison by the second judging step, when the second judging step judges that the information recording device can record information.

12. A computer readable medium having embedded thereon, a computer program for information recording control executed by a computer in an information recording device which records information on an information recording medium comprising version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the compatibility version information corresponding to one of the high speed recording condition information for recording information at the high recording speed, the program product controls the computer to function as: a first judging unit for comparing the version information recorded on the information recording medium with version information of the information recording device to judge whether or not the version information recorded on the information recording medium coincides with the version information of the information recording device, coinciding indication that the information recording device can record information on the information recording medium, and not coinciding indicating that the information recording device cannot record information on the information recording medium based on the version information; a second judging unit for comparing the compatibility version information of the information recording medium with the version information of the information recording device to judge whether or not the information recording device can record information on the information recording medium based on the compatibility version information, when the first judging unit judges that the information recording device cannot record information; and a recording unit for recording the information the information recording medium when one of the first judging unit and the second judging unit judges that the information recording device can record information, wherein the recording unit records the information at the recording speed of the high speed recording condition information corresponding to the compatibility information which coincides with the version information of the information recording device in comparison by the judging unit, when the judging unit judges that the information recording device can record information.

13. A computer program storage medium for storing a computer program for information recording control executed by a computer in an information recording device which records information on an information recording medium comprising version information indicating a version of a recording standard; normal recording condition information for recording information at a normal recording speed; high speed recording condition information for recording the information at one or more high recording speed higher than the normal recording speed; and compatibility version information indicating the version of the recording standard to which the high speed recording condition information is adapted, the compatibility version information corresponding to one of the high speed recording condition information for recording information at the high recording speed, the program controls the computer to function as:
- a first judging unit for comparing the version information recorded on the information recording medium with version information of the information recording device to judge whether or not the version information recorded on the information recording medium coincides with the version information of the information recording device, coinciding indicating that the information recording device can record information on the information recording medium, and not coinciding indicating that the information recording device can not record information on the information recording medium based on the version information;

a second judging unit for comparing the compatibility version information of the information recording medium with the version information of the information recording device to judge whether or not the information recording device can record information on the information recording medium based on the compatibility version information, when the first judging unit judges that the information recording device cannot record information; and a recording unit for recording the information on the information recording medium when one of the first judging unit and the second judging unit judges that the information recording device can record information, wherein the recording unit records the information at the recording speed of the high speed recording condition information corresponding to the compatibility information which coincides with the version information of the information recording device in comparison by the judging unit, when the judging unit judges that the information recording device can record information.

14. An information recording method for recording information on an information recording disc, comprising the steps of:

an information recording drive device reading, from a lead-in area of a recording disc, a part version information of a recording standard defining a recording method suitable for the disc and indicating as to which version of the recording standard the disc is adapted, the drive device comparing the part version information to a version information of the drive device indicating the version of the recording standard to which the drive device can record information, and determining that the version information of the drive device is lower than the part version information of the disc and indicating that a maximum recording speed (mX) of the drive device is less than a maximum recording speed (nX, mX<nX) of the disc;

the drive device reading, from pre-recorded information on the disc, compatibility version information of the recording standard with which data can be recorded on the disc, the pre-recorded information including plural compatibility version information ranging from a first compatibility version information corresponding to a first recording speed higher than a normal recording speed (2×, 4×) to another compatibility version information corresponding to the maximum recording speed of the disc (4×, 8×);

the drive device determining, from the read compatibility version information, one compatibility version information that coincides to the version information of the drive device indicating the version of the recording standard to which the drive device can record information;

the drive device reading, from the prerecorded information, a write strategy corresponding to the determined one compatibility version, and the drive device recording information, on the disk, at the maximum recording speed (mX) of the drive device using the write strategy read from the pre-recorded information corresponding to the determined one compatibility version.

15. An information recording method for recording information on an information recording medium of claim 14, wherein, the recording disc is one of a DVD-R and a DVD-RW.

16. An information recording method for recording information on an information recording medium of claim 14, wherein, a different write strategy corresponds to each of at least two of the plural different compatibility version information on the disc.

17. An information recording method for recording information on an information recording medium of claim 16, wherein, a write strategy for double speed recording ("2×") corresponds to a first compatibility version information, and a write strategy for 4-times speed recording ("4×") corresponds to a second compatibility version information.

18. An information recording method for recording information on an information recording medium of claim 16, wherein, a write strategy for double speed recording corresponds to a first compatibility version information, a write strategy for 4-times speed recording ("4×") corresponds to a second compatibility version information, and a write strategy for 8-times speed recording ("8×") corresponds to a third compatibility version information.

19. An information recording method for recording information on an information recording medium of claim 16, wherein, a write strategy for 4-times speed recording ("4×") corresponds to a first compatibility version information, and a write strategy for the maximum recording speed of the disc corresponds to a second compatibility version information.

\* \* \* \* \*